United States Patent Office 3,752,705
Patented Aug. 14, 1973

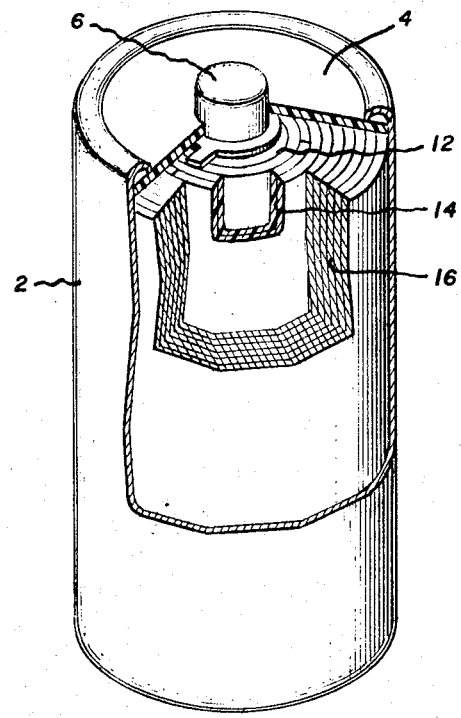
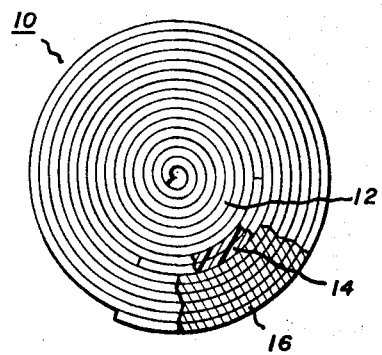

3,752,705
HIGH CAPACITY RECHARGEABLE SEALED CELL
Saverio F. Pensabene, Gainesville, Fla., assignor to
General Electric Company
Filed Sept. 17, 1971, Ser. No. 181,305
Int. Cl. H01m 35/16
U.S. Cl. 136—13
6 Claims

ABSTRACT OF THE DISCLOSURE

A high capacity, rechargeable sealed cell is constructed using plate materials normally used in the construction of low capacity, high discharge rate materials. The cell is constructed by winding a strip of one of the electrodes onto itself, winding a layer of separator materials over this core, and winding a layer of the other electrode onto itself over the separator material. By eliminating the layers of separator between adjacent materials—except for the single layer of separator between the two plates—additional space is provided in the same volume so that additional active electrode material may be incorporated into the cell.

BACKGROUND OF THE INVENTION

This invention relates to rechargeable, sealed cells. More particularly, the invention relates to the construction of high capacity, sealed rechargeable cells.

In the cell design of rechargeable electrochemical cells it is customary to arrange and design the electrode plates for either a high capacity, low discharge rate application or conversely a low capacity, high discharge rate application. In the first instance, the active material is usually densely packed into tubes or pockets surrounded by screens or, in the case of tubes, by perforations in the tube to allow the electrolyte to have access to the material. However, the access of the electrolyte to the active material is somewhat limited and hence the discharge rate is not high. Furthermore, such constructions do not lend themselves to the manufacture of sealed cells because the inaccessibility of the active materials inhibits the recombination of generated gasses within the active materials resulting in undesirable pressure buildups within the cell.

In one construction of electrodes for high discharge rate application the active materials is deposited in sintered plates having a fair degree of porosity to allow direct communication between the electrolyte and a larger surface area of the material. In one particular design of low capacity, high discharge rate cells made with these electrodes it is customary to spirally wound the sintered plates containing the active material into a roll having separator materials between the adjacent negative and positive layers throughout the roll. The separator material acts as a wick for the electrolyte and hence, even though the electrode strips are tightly wound in a roll, all surfaces of the plates are contacted by the electrolyte in the separator. In the construction of such a roll, however, the separators, to achieve this wicking effect, take up a fair amount of the total volume. Thus, if higher capacity is desired at the same charging and discharge rate the total volume must be increased.

The alternate constructions for high capacity electrodes, and high discharge rate electrodes described above, to be efficient, each require a fair amount of capital investment for manufacturing equipment to produce the electrode materials. When both types of cells are desired the amount of equipment necessary to produce the starting materials is, accordingly, greatly increased. It would be desirable to provide a design for a high capacity cell using the materials normally used in constructing a high discharge rate cell.

It is therefore an object of this invention to provide a design for a high capacity cell using the electrode materials normally used for high discharge rate cells. Other objects of the invention will be apparent from the description and drawings.

DESCRIPTION OF THE DRAWINGS

FIG. 1 is a partially cutaway isometric view of the invention.

FIG. 2 is a cross-section of the construction of the invention.

DESCRIPTION OF THE PREFERRED EMBODIMENT

In accordance with the invention, a high capacity cell is produced using the electrode materials normally used in constructing a high discharge rate cell.

Referring now to the drawings, a cell is generally indicated comprising an outer casing 2 having an insulated cover member thereon 4 to provide a positive terminal 6, the casing 2 serving as the negative terminal of the cell. The casing is generally cylindrical to allow a cylindrically shaped electrode roll to fit compactly therein and is constructed of a material which is not subjected to chemical attack by the particular electrolyte used. In a preferred embodiment the cell is a nickel-cadmium cell using a KOH electrolyte and therefore casing 2 of the cell is constructed of an alkali resistant material such as, for example, nickel.

The electrode roll 10 to be placed within casing 2 is constructed using electrode strips similar to that shown in U.S. Pat. 3,503,806 issued Mar. 31, 1970 and assigned to the assignee of this application. The arrangement of the plates in that patent is for a low capacity, high discharge rate cell in contrast to the present design of a high capacity, low discharge rate cell. In accordance with the invention, however, as stated above, for manufacturing efficiencies the same electrode plate materials are used in the construction of the cell of the present invention as is used in the low capacity, high discharge rate cells.

In contrast, however, to the construction shown in the aforementioned patent, in accordance with the invention, electrode roll 10 is constructed by winding a strip 12 of one of the electrodes, for example, the positive plate, onto itself, without a separator between the adjacent layers, to form a core of positive plate material in a cylindrical roll. After the positive plate has been wound into a roll a layer 14 of separator material, which may be any conventionally used separator material, is wound around the positive plate roll to provide an insulative layer. A strip 16 of negative plate is then wound around the coil without any separator material between adjacent layers of the negative plate. Appropriate connections are made to the positive and negative plates in any conventional manner such as, for example, by providing a series of tabs on one end of, for example, the positive plate and connecting these tabs by a terminal strap to the positive terminal and similarily connecting a second series of tabs provided on the negative plate via a terminal strap to the casing, or conversely by alternately protruding the negative and positive plate materials adjacent the opposite ends of the roll as described and claimed in the Sugalski U.S. patent referred to above.

By eliminating the layers of separator normally used in the spiral winding of the negative and positive plates together throughout the entire battery coil additional space is provided for the incorporation of additional amounts of both the negative and positive strip to provide additional capacity without any increase in volume. The successful elimination of these layers of separator material was surprising because it was thought that the use of the separator material in contact with all surfaces of the electrodes was necessary to provide a wick for the electrolyte.

To illustrate the invention a series of cells of various sizes were constructed in accordance with the invention. The total ampere minute of each cell was determined by discharging the cell to 0.6 volt at 1 amp followed by a second discharge to 0.6 volt at 100 ma. The results are tabulated below:

TABLE I

|  | Cell 1 | Cell 2 | Cell 3 |
|---|---|---|---|
| Plate length, inches: |  |  |  |
| Positive | 5.0 | 7.0 | 8.6 |
| Negative | 5.0 | 7.0 | 8.6 |
| Roll diameter, inches | 0.695 | 0.795 | 0.825 |
| Capacity (amp-minutes) | 62 | 91 | 104 |

In comparison, a cell constructed using conventional spiral winding techniques, i.e. negative and positive plates wound together with a separator therebetween and having the same diameter as cell 3, contains only about 14" of electrode (total of positive and negative). Using 7" as an average figure for each electrode and a capacity of about 12.5 amp-minutes per inch (the average efficiency of cells 1–3 above and a typical efficiency for cells of the prior art design) it can be seen that a cell having the same efficiency but constructed according to the prior art would have a capacity of about $7 \times 12.5 = 88$ amp-minutes.

Thus, it is seen a cell construction is provided in accordance with the invention to yield a rechargeable, sealed cell having a higher capacity per unit volume yet capable of efficient gas recombination and using materials normally used in the construction of low capacity, high discharge rate cells. The invention thus provides manufacturing economies by allowing the identical materials to be used in constructing of both the types of cells normally needed in industry.

What I claim as new and desire to secure by Letters Patent of the United States is:

1. A high capacity sealed cell comprising a metallic casing having an insulated terminal thereon and containing an electrolyte and an electrode roll comprising an inner core of plate maetrial, said inner core consisting of a strip of one electrode of sufficient length wound onto itself providing a multiple layered core, a strip of separator material wound around the core, and an outer layer of plate material consisting of a strip of electrode material of opposite polarity wound about the separator, said plate materials being respectively electrically connected to said insulated terminal and said casing.

2. The cell of claim 1 wherein said electrodes comprise sintered plates having active electrode material deposited therein.

3. The cell of claim 1 wherein said inner core of plate material comprises the positive electrode.

4. The cell of claim 1 wherein said multiple-layer core provides at least one complete revolution of one surface of said strip facing the other surface of said strip in said core.

5. The cell of claim 1 wherein said inner core comprises the positive, nickel electrode of a nickel-cadmium cell and said outer electrode strip comprises the cadmium, negative electrode.

6. The cell of claim 5 wherein said outer electrode strip comprises at least two layers of a single electrode strip wound about itself so that one surface of said strip faces the opposite surface of said strip through at least 360 degrees of revolution.

References Cited
UNITED STATES PATENTS

| 3,314,821 | 4/1967 | Lambert et al. | 136—6 |
| 3,364,069 | 1/1968 | Deschamps | 136—13 |
| 3,373,060 | 3/1968 | Gray | 136—13 X |
| 3,503,806 | 3/1970 | Sugalski | 136—13 |

ANTHONY SKAPARS, Primary Examiner